United States Patent
Slotznick (12)

(10) Patent No.: US 6,609,146 B1
(45) Date of Patent: Aug. 19, 2003

(54) SYSTEM FOR AUTOMATICALLY SWITCHING BETWEEN TWO EXECUTABLE PROGRAMS AT A USER'S COMPUTER INTERFACE DURING PROCESSING BY ONE OF THE EXECUTABLE PROGRAMS

(76) Inventor: Benjamin Slotznick, 507 Third St., P.O. Box 23, Mt. Gretna, PA (US) 17064

( * ) Notice: Subject to any disclaimer, the term of this patent is extended or adjusted under 35 U.S.C. 154(b) by 0 days.

(21) Appl. No.: 09/188,945

(22) Filed: Nov. 10, 1998

Related U.S. Application Data

(60) Provisional application No. 60/065,457, filed on Nov. 12, 1997.

(51) Int. Cl.[7] ............................................. G06F 15/16
(52) U.S. Cl. ...................................... 709/200; 345/805
(58) Field of Search ................................ 709/234, 100, 709/200–203, 218; 345/123, 349, 434, 340, 341, 115, 342, 798, 744; 370/228; 340/554; 707/500; 705/52; 702/187; 380/25; 84/622

(56) References Cited

U.S. PATENT DOCUMENTS

| | | | |
|---|---|---|---|
| 5,029,104 A | | 7/1991 | Dodson et al. |
| 5,075,675 A | * | 12/1991 | Barker et al. ............... 345/340 |
| 5,220,516 A | | 6/1993 | Dodson et al. |
| 5,296,848 A | | 3/1994 | Witheridge et al. |
| 5,442,788 A | | 8/1995 | Bier |
| 5,535,334 A | | 7/1996 | Merkley et al. |
| 5,557,725 A | * | 9/1996 | Ansberry et al. ............ 345/755 |
| 5,568,603 A | * | 10/1996 | Chen et al. .................. 345/341 |
| 5,572,643 A | | 11/1996 | Judson |
| 5,583,984 A | | 12/1996 | Conrad et al. |
| 5,621,878 A | | 4/1997 | Owens et al. |
| 5,621,880 A | | 4/1997 | Johnson |
| 5,630,042 A | | 5/1997 | McIntosh et al. |
| 5,638,114 A | * | 6/1997 | Hatanaka et al. .............. 348/15 |
| 5,673,403 A | * | 9/1997 | Brown et al. ................ 345/744 |

(List continued on next page.)

FOREIGN PATENT DOCUMENTS

| | | |
|---|---|---|
| WO | 97/48198 | 12/1997 |
| WO | 98/25198 | 6/1998 |
| WO | 98035468 | 8/1998 |

OTHER PUBLICATIONS

DT Software, dtsearch manual. 1997.*
Using X, www.cs.rutgers.edu/LCSR–Computing/x.*
IFullScreenVideo Interface, www.microsoft.com/devonly/tech/amov 1 doc/amsdk054–079.*
Simplified Applications for Network Computers, www.acm.org/sigchi/chi97/proceedings/briefing/dg.*

(List continued on next page.)

*Primary Examiner*—Mark R. Powell
*Assistant Examiner*—Thong Vu
(74) *Attorney, Agent, or Firm*—Akin Gump Strauss Hauer & Feld, L.L.P.

(57) ABSTRACT

Automatic switching between two executable programs occurs between a first mode wherein a first executable program is visible and active, and a second mode wherein a second executable program is visible and active. Switching is triggered by detecting that the first executable program has initiated an information processing mode. The first mode is restored upon completion of information processing. In one particular embodiment of the present invention, the first executable program is a browser for requesting, receiving and displaying information obtained from remote information sources, the first mode is a browser mode, and the information processing mode is the requesting by the browser for information.

99 Claims, 4 Drawing Sheets

U.S. PATENT DOCUMENTS

| | | | | |
|---|---|---|---|---|
| 5,680,535 | A | | 10/1997 | Harbin et al. |
| 5,686,937 | A | * | 11/1997 | Li .............................. 345/123 |
| 5,721,849 | A | | 2/1998 | Amro |
| 5,734,119 | A | * | 3/1998 | France et al. ................. 84/622 |
| 5,737,619 | A | * | 4/1998 | Judson ....................... 707/500 |
| 5,781,192 | A | | 7/1998 | Kodimer |
| 5,781,894 | A | | 7/1998 | Petrecca et al. |
| 5,812,132 | A | | 9/1998 | Goldstein |
| 5,819,055 | A | * | 10/1998 | MacLean et al. ........... 345/798 |
| 5,819,284 | A | | 10/1998 | Farber et al. |
| 5,821,927 | A | | 10/1998 | Gong |
| 5,835,083 | A | | 11/1998 | Nielsen et al. |
| 5,845,084 | A | * | 12/1998 | Cordell et al. .............. 709/234 |
| 5,877,755 | A | * | 3/1999 | Hellhake .................... 345/327 |
| 5,896,141 | A | * | 4/1999 | Blaho et al. ................ 345/541 |
| 5,923,326 | A | * | 7/1999 | Bittinger et al. ............ 345/805 |
| 5,926,806 | A | * | 7/1999 | Marshall et al. ............... 707/3 |
| 5,940,077 | A | * | 8/1999 | Amro ......................... 345/342 |
| 5,987,135 | A | * | 11/1999 | Johnson et al. ............... 380/25 |
| 5,991,799 | A | * | 11/1999 | Yen et al. ................... 709/218 |
| 6,003,063 | A | * | 12/1999 | Wiley ......................... 709/108 |
| 6,011,537 | A | * | 1/2000 | Slotznick .................... 345/115 |
| 6,025,841 | A | * | 2/2000 | Finkelstein et al. ......... 345/342 |
| 6,031,533 | A | * | 2/2000 | Peddada et al. ............ 345/349 |
| 6,115,680 | A | * | 9/2000 | Coffee et al. ............... 702/187 |
| 6,141,528 | A | * | 10/2000 | Remschel ................... 434/350 |
| 6,192,348 | B1 | * | 2/2001 | Mrva et al. .................... 705/52 |
| 6,201,548 | B1 | * | 3/2001 | Cariffe et al. ............... 345/434 |
| 6,212,541 | B1 | * | 4/2001 | McAuliffe et al. .......... 709/100 |

OTHER PUBLICATIONS

Miksanek, C. "Exploiting OS/2 REXX EHLLAPI (Technology Tutuorial)," *Enterprise Systems Journal*, vol. 11, No. 9, Sep. 1996, p. 10(7). (full–text printout of article from Dialog, 10 pages).

"Automatic Window Management Mode," *IBM Techincal Disclosure Bulletin*, Sep. 1992. (full–text printout from Software Patent Institute Database of Software Technologies, Serial No. TDB0992.0065, 2 pages).

"Troubleshooting Utilities," *HP VUE 3.0 Ueser's Guide*, Chapter 29, Hewlwtt–Packard, Palo Alto, California, Jul. 1992. (full–text printout from Software Patent Institute Database of Software Technologies, Serial No hp30085.0172, 2 pages).

Shneiderman, B. et al. *"Multiple Window Coordination for Visual Information Access in High Performance User Interfaces,"* printout from website (www.cs.tufts.edu/~jacob/isgw/Shneiderman.html) Aug. 12, 1998 printout date, 3 pages. Article publication date unknown but might be 1995.

Plaisant, C. et al. *"Image Browers: Taxonomy, Guidelines, and Informal Specifications,"* printout from website (ftp://ftp.cs.umd.edu/pub/papers/papers/3282/3282.bib) Aug. 12, 1998 printout date, abstract only of article, 1 page. Publication date unknown but might be Apr. 1994 or Feb. 1995.

Shneiderman, B. *"The Future of Graphic User Interfaces: Personal Role Managers,"* printout from website (ftp://ftp.cs.umd.edu/pub/papers/papers/3285/3285.bib) Aug. 12 1998 printout date, abstract only article, 1 page. Publication date unknown but might be May 1994 or May 1995.

Kandogan, E. et al. *"Improved Spatial Layout and Rapid Multiple Window Operations,"* ACM Proc. of the Workshop on Advanced Visual Interfaces, AVI '96 (Gubbio, Italy, May 27–29, 1996) pages 29–38, printout from website (ftp://ftp.cs.umd.edu/pub/hcil/Reports–Abstracts–Bibliography/3522.txt) Aug. 12, 1998 printout date, 14 pages.

Tomoyuki, K. "A Window Controller," *Toshiba Gijutsu Kokaishu*, vol. 13, No. 63, 1995, pp. 159–162. (Printout of abstract only of article from Dialog, 1 page).

Salemi, J. "Mirror for Windows 1.1" (*Software review*), PC–Computing, vol. 6, No. 4, Apr. 1993, p. 193(2). (full–text printout of article from Dialog, 2 pages).

International Search Report for WO 98035468, publication date of search report: Dec. 3, 1998.

Rosenthal, M. "HyperStitial Advertising—Streamix reinvents the commercial", *Web Review*, Aug. 29, 1997, Article downloaded from Streamix Press Release website (www-.streamix.com/e–4c5.htm) on Jan. 15, 1998, 2 pages.

About Streamix Systems web page, downloaded from Streamix website (www.streamix.com/e4a.htm) on Jan. 15, 1997, 2 pages.

Frequently Asked Questions, downloaded from Streamix Advertisers Main page website (www.streamix.com/e5.htm) on Jan. 15, 1997, 2 pages).

International Search Report for PCT/US98/23885 (equivalent to U.S. Application No. 09/188,945), Mailing Date: Mar. 19, 1998, 2 pages.

International Preliminary Examination Report for PCT/US98/23885, mailed Mar. 12, 2001, 6 sheets.

* cited by examiner

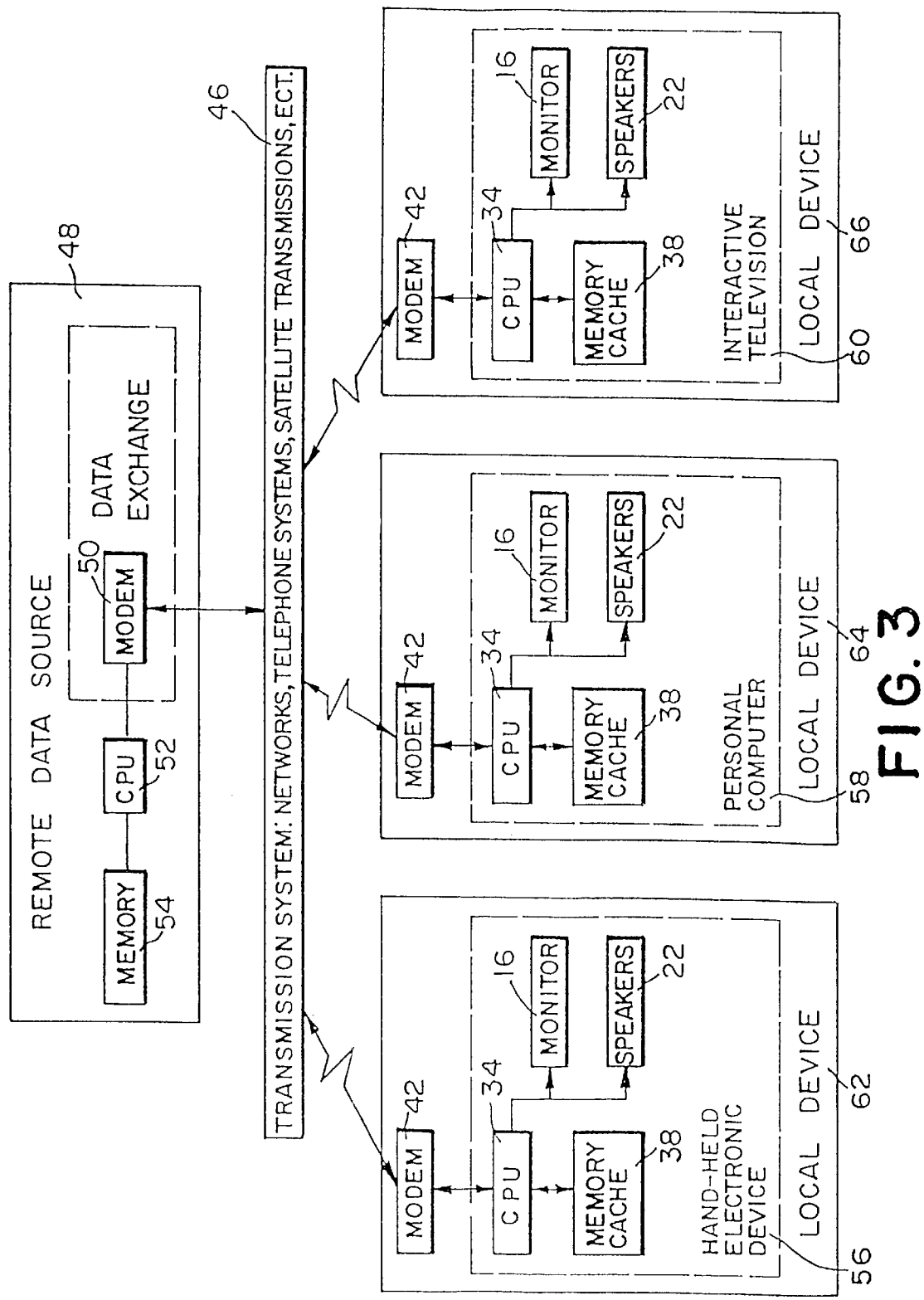

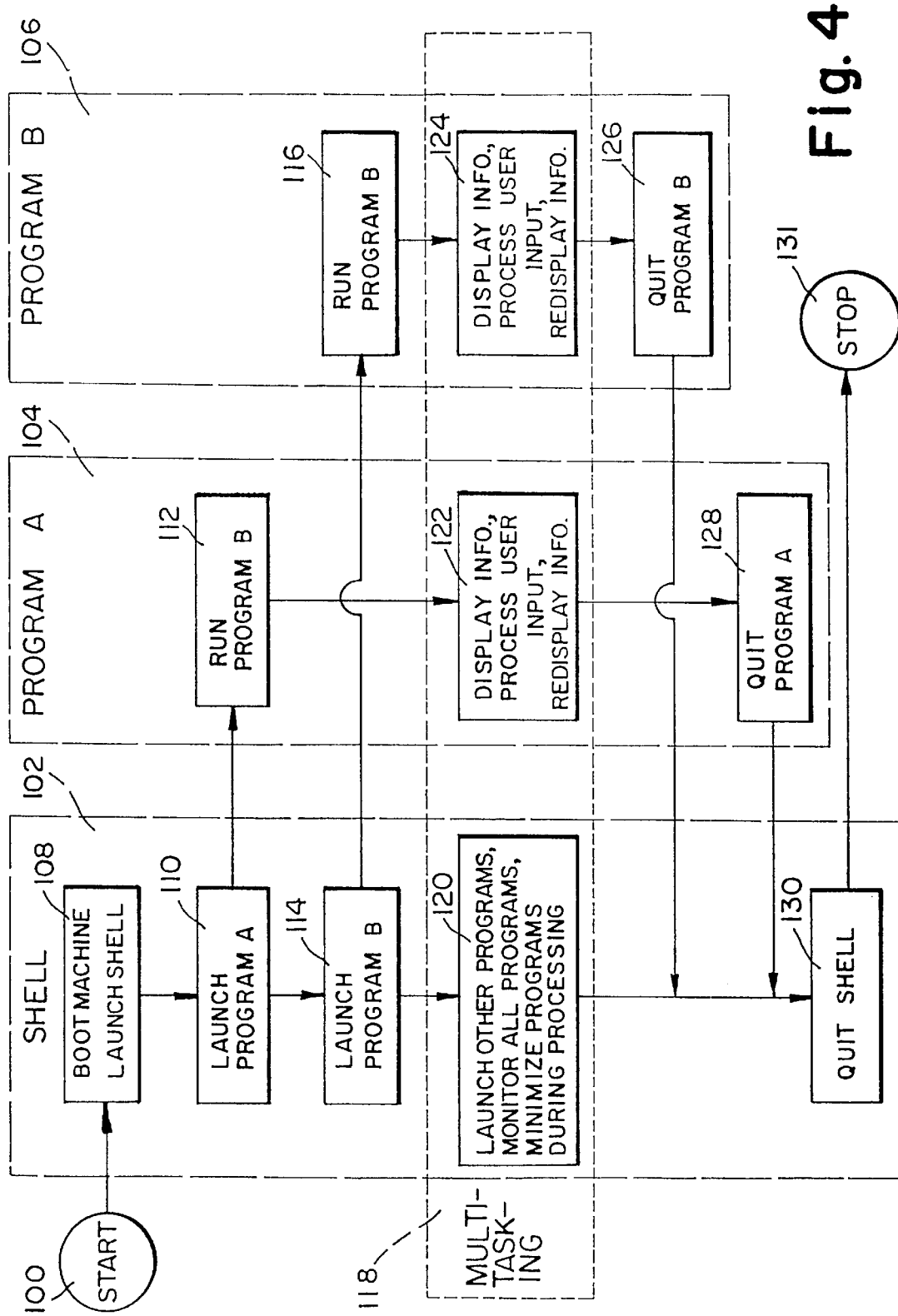

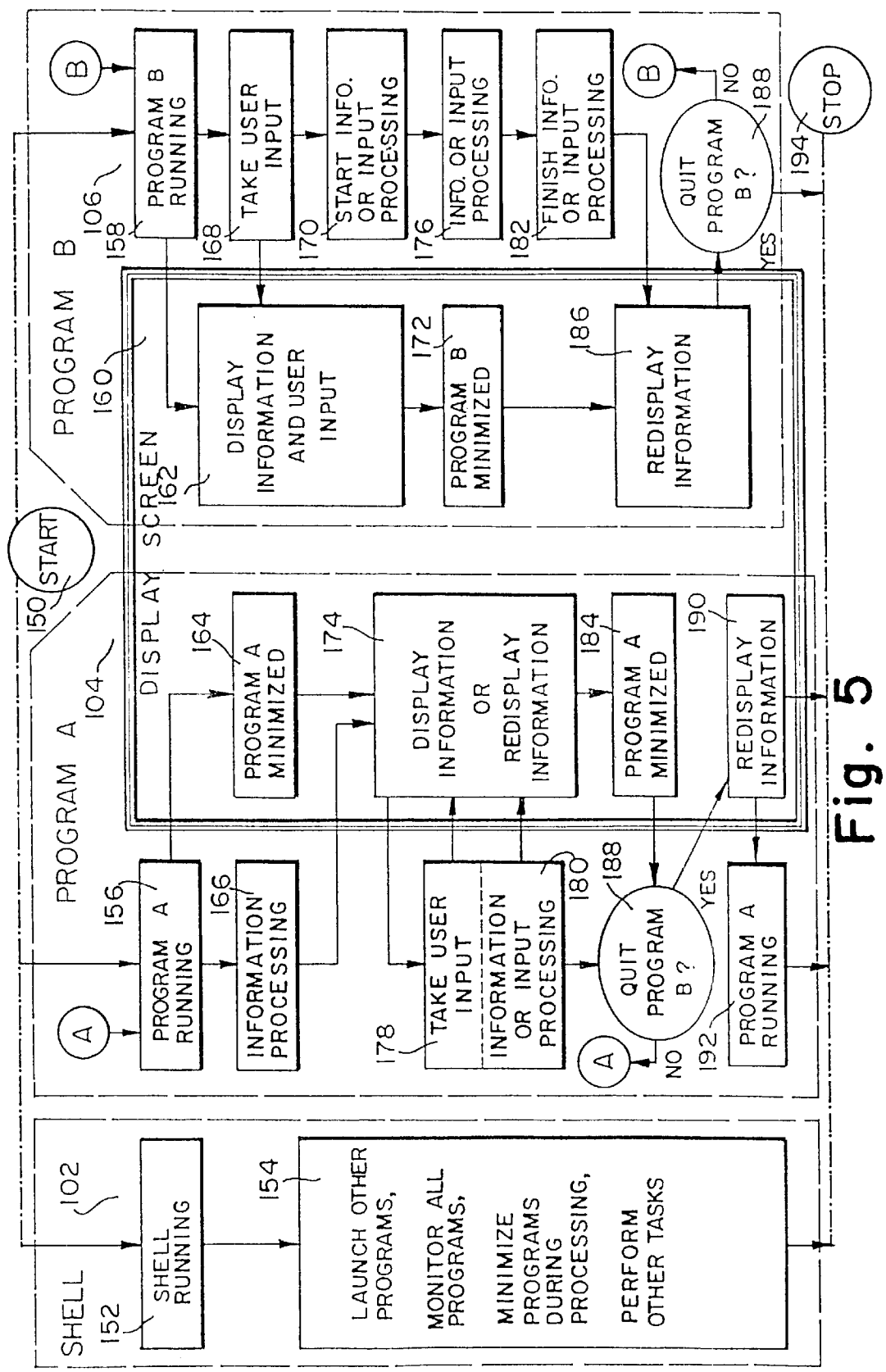

SYSTEM FOR AUTOMATICALLY SWITCHING BETWEEN TWO EXECUTABLE PROGRAMS AT A USER'S COMPUTER INTERFACE DURING PROCESSING BY ONE OF THE EXECUTABLE PROGRAMS

CROSS-REFERENCE TO RELATED APPLICATIONS

This application claims the benefit of U.S. Provisional Application No. 60/065,457 filed Nov. 12, 1997, entitled "WINDOW MINIMIZER DURING PROCESSING."

BACKGROUND OF THE INVENTION

This invention relates generally to computers either standing alone, or operated in computer networks, and more particularly to a method for enhancing the operations of a graphical user interface in a single or multi-windowed graphics environment.

Today most users interact with their personal computers via graphical user interfaces (GUIs) typified by the Windows and Macintosh operating systems. Such GUIs frequently display each working program within a rectangular portion of the display screen called a "frame" or "window."

A window can be small or fill up the whole screen. Frequently a window can be resized by the user by "point, click and drag" or by programmed software controls. Likewise, in many instances, a window can be positioned or moved by the user by "point, click and drag" or by software programming. In many instances, a window can be "minimized" which keeps the program working, but reduces the window to a mere label or button or icon and places the label or button on the status line of the display, or otherwise masks the window. Frequently, a window or frame can be minimized by the user by clicking on an icon, or by software within the window's program.

The display screen may contain more than one window, either side-by-side or overlapping. The multiple windows may be different programs, or multiple instances of the same program. In multi-tasking environments, each window may be processing information and data, locally or remotely, even if it is partly or fully covered by another window.

Even though several windows may be working at one time, one window is designated as "active" by the system and the system looks for user input through that window. The "active" window is usually fully visible, and is usually "on top" of the others. When a window first opens, it is usually considered active and usually goes on top. When a user clicks on part of a window (even if most is hidden) that window usually becomes active and usually goes on top.

Some computer processes take a discernible amount of time, including recalculating large spreadsheets, or searching long documents for phrases, producing CAD based graphics or downloading data from a remote source. In a multi-tasking computer system, the user does not have to sit idle while the processing occurs, but can work on a different program (a) by opening another window for the different program, (b) by clicking on a portion of the different program's window if previously opened or (c) by minimizing the window of the program engaged in the lengthy processing. In some programs, the user may also use a drop down list to select among current working windows, even if hidden. In the recently released Internet Explorer 4.0 integration with the Windows 95 desktop, a user can minimize all open windows by clicking on a single icon to view the basic underlying "desktop."

Nonetheless, many computer users do sit idle during certain long processes. Sometimes it is because they are absorbed in the current task and forget the option of working on another. Sometimes it is because they believe that in switching to another task (and program) they may get distracted from the current task at hand, and fail to return in a timely manner. (After all, one can not tell when the program in a minimized window completes its processing.) Sometimes it is because users believe the process will take only a short time, so that switching windows is wasted effort because no useful or pleasant task can be done in the expected short waiting period.

Partial remedies are found in "screen-saver" programs. If the processing time is lengthy, the lack of user input may cause the system to display a "screen-saver" program, which may contain electronic images, or electronic news bulletins (e.g., the Pointcast system). These screen-saver programs start the display after a certain preset time of user inactivity, i.e. no inputs from the user such as striking keys on a keyboard or moving a mouse; and they end the display (returning to the "active" program or underlying desktop) when user input begins again (e.g., when keys are struck or a mouse moved). But this triggering method is not useful for all processing times, particularly short ones. Most importantly, current screen-savers do not know when the computer has finished the processing task, rather the user has to guess when the process was completed and move the mouse or provide other input to manually terminate the screen-saver display. In addition, the time between when a user last provides input to the computer and the initiation of the screen saver display is selectable (variable) by the user.

Almost as importantly, to be useful for short processing times, a screen-saver would have to trigger immediately, i.e. when no user input is given for a fraction of a second. However, one does not want the screen saver launched when one is merely mulling over the proper word to insert in a letter one is writing on the word processor.

Yet even in the shortest processing wait period there is useful work or pleasing "tasks" that can be done: from reviewing the days schedule, to viewing electronic art; from answering a company survey, to perusing company bulletins; from reading e-mail (which is usually short and pithy) to entering billable time records; from viewing screensaver type newscasts (e.g., the Pointcast system), to filling out purchase orders; from viewing advertisements, to ordering merchandise to perusing the underlying "desktop." Of course, during the waiting time one could play computer games (including continuing action games like Asteroids and card games like solitaire). Current technology allows some personal computers to function as a television or radio. Technically, one could even watch television on the computer monitor or listen to radio broadcasts during these waiting periods.

U.S. Pat. No. 5,572,643 (Judson), the entire disclosure of which is incorporated by reference herein, discloses methods of displaying otherwise hidden information objects during an interstitial time. The term "interstitial time" herein refers to the time period from when a user clicks on a hyperlink in an Internet web page (in order to access a new Internet web page) until that new web page has finished downloading to the user's computer and has been displayed. Judson's claims relate to situations in which the information object was downloaded from the Internet along with a web page and is hidden or masked and not displayed, and then is displayed after that web page is left when the user clicks on a link to a new web page (during at least part of the interstitial time). In Judson, the information object is displayed within the Internet browser, and thus operates inside of, and dependent upon, the browser. In contrast, the present invention (the subject of this patent application) teaches a method of displaying a program which was running and may have been visible prior to the launch of the current program, by hiding the current program to reveal the previously displayed program anew. In the present invention, the two programs operate outside of, and independent of, each other. The present invention is neither restricted to Internet processes nor information downloaded with a web page nor hidden information.

The Adlet Corporation claims a patent pending method of embedding a Java program applet in a web page that will open or spawn a window at the beginning (or during) the interstitial time to show an advertisement or other information object. This window closes in a timed or contingent manner. Again this relates to displaying an information object once after a specific page, rather than accessing or redisplaying an underlying and/or ongoing program or information object(s) or information stream.

Other Internet programs (whether embedded in web sites or service provider access software) spawn windows (especially ones containing advertisements) that remain on the screen even though new pages are accessed. They may remain on the screen both during the time the pages are downloading and afterwards. These programs do not automatically spawn at or during the interstitial time, or end at its conclusion or otherwise switch between programs, windows or information streams.

BRIEF SUMMARY OF THE PRESENT INVENTION

The primary purpose of this invention is to automatically minimize (or otherwise mask or hide) a window of a program while the program is processing information and then to automatically return the window to its previous size and position at some timed interval, or when the processing is done, or some other event occurs. The window might be returned to its previous size and position upon some other contingent event or combination of timed and contingent events. Instead of minimizing or hiding a window, the window might just be reduced in size, or moved to a different (perhaps less prominent position). (Alternatively, another program may have its window enlarged and/or repositioned to be more prominent.) The device may be alternatively characterized as automatically switching between program interfaces; switching away from the interface of a program that has begun an information processing operation and switching to the interface of a different program that is ready for user interaction, and then after the information processing operation has been completed, switching back.

This purpose may be accomplished by automatically minimizing just the window that's involved in the processing, or by automatically minimizing more than one window, perhaps even automatically minimizing all windows. Alternatively this purpose may be accomplished by automatically placing a particular window (or windows) on the "top" "layer" of the desktop, in a full or partial screen display, or otherwise launching or opening such a window (or windows). It may be accomplished by automatically moving one or more windows to a "back" or "bottom" or "Z" layer, thereby revealing other windows. It may be done by automatically re-sizing or moving one or more windows. It may be accomplished by quieting or reducing the volume of audio associated with the window or program doing the processing and/or increasing or turning on the volume of audio associated with another program. Alternatively, this purpose may be accomplished by maximizing another window, that may have been previously (1) masked (fully or partially), (2) otherwise hidden or minimized, or (3) displayed in a reduced size or less prominent position. This primary purpose may be accomplished by a combination of the above, with or without similar or related effects known to those knowledgeable in the art.

The invention may control only a particular program, in which case only that program will automatically be minimized. Alternatively the invention may control several programs, or even all programs on the computer.

The invention may contain a hierarchy of which programs will be displayed when others are being processed, or it may defer to the program that was last active. Such a hierarchy may be hard-coded, or chosen by the user as part of his or her preference settings. In other embodiments, the user may choose a "channel" or program from an onscreen display that is always or sometimes visible (e.g., a taskbar or icon).

Alternatively, when the processing starts and the program is about to be minimized, the user may be queried by a pop-up dialog box or synthesized voice module, about what should be displayed during the processing. Some programs now post estimated processing times (particularly for downloads which can take hours). That would be an appropriate time for the device to query the user as to whether he or she wanted to see the day's schedule, view a full length movie, etc.

In the preferred embodiment, when the processing stops, the window which has been minimized, hidden or reduced is returned to its former size and position, however, in an alternate embodiment, the display screen may show the image of a "pause" button (or some other virtual or physical control) which when pressed or activated keeps the current window on the screen and prevents the reintroduction of the former window, at least until some control is activated (such as pressing the "pause" button again, or pressing a "resume" button). Alternatively the invention may include other control or navigation buttons which change the course of what is minimized and what is maximized.

These alternate controls may include a "panic" button that switches the screen to a preferred use, so that a user can quickly return to appropriate work when he or she has been using the computer to "goof off." Other controls include hyperlinks or other links that automatically connect to another item to be displayed, or otherwise launch a program or data object.

In addition to overt controls, the invention may have automatic controls. An example is an automatic pause control that does not minimize a window as long as,the user is inputting data into it (e.g., typing input for a fill-in form, or clicking items on a check list).

The invention may be embodied as a shell, plug-in or operating system or part thereof. The invention may be embodied as a multi-threaded or multi-tasking application, or may simulate such a multi-threaded or multi-tasking device. The invention may be embodied as two applications with a shell (or other coding) which switches between them, or it may be embodied as more than two such applications. The applications may be any applications used on a computer including desktop productivity programs such as spread sheets, word processors, relational data bases, paint and illustration programs, drafting or CAD programs, desktop publishing programs, photo editing programs, scheduling or calendaring programs, browsers, etc. They may be several applications or several instances of the same application.

The devices and methods that are the subject of this patent application not only have a use in their own right of switching between programs or information objects or information streams, but also in the setting of Internet or other network usage, said devices and methods will filter or block interstitial advertisements or other interstitial information objects by substituting something (e.g., a blank screen or wallpaper, an alternate program or screen-saver, etc.) during the interstitial time. These devices and methods thereby overwrite and hence block or filter the advertisement or information object embedded in the web page or otherwise downloaded data from the network.

Instead of blocking all interstitial advertisements or interstitial information objects, the device may selectively block or filter information. It may do so by scanning meta tags that accompany or are embedded in the web page containing the hidden information object. Such meta tags could contain content or rating information so that, for example, the device would filter out (i.e. "overwrite") violent or adult content advertisements. Alternately, the device could scan the entire web page, to recognize the tags associated with certain types of applets, or interstitial objects and filter out particular ones, or filter out everything except permitted interstitial objects. Alternatively, the device could scan the web page for certain combinations of words or characters which would act as triggering signals for the device to filter out that web page, or in the alternative, for the device to permit the interstitial object accompanying the web page to be displayed (i.e. not blocked out).

BRIEF DESCRIPTION OF THE DRAWINGS

The following detailed description of preferred embodiments of the invention would be better understood when read in conjunction with the appended drawings. For the purpose of illustrating the invention, there is shown in the drawings embodiments which are presently preferred. It should be understood, however that the invention is not limited to the precise arrangements and instrumentalities shown. In the drawings:

FIG. 3 is a schematic block diagram of an interconnected device for automatically minimizing the graphical user interface of a program during the program's processing time, in accordance with another embodiment of the present invention;

FIG. 4 is a flow diagram of a method used to launch, run and quit programs with graphical user interfaces, with a delineation of the portion of the run time during which a multi-tasking shell program will automatically minimize the graphical user interface of a program during the program's processing time in accordance with a device of FIG. 3; and FIG. 5 is an expansion of the multi-tasking portion of FIG. 4, which shows a flow diagram of a method for automatically minimizing the graphical user interface of a program during the program's processing, in accordance with a device of FIG. 3.

DETAILED DESCRIPTION OF THE INVENTION

Figure 1:
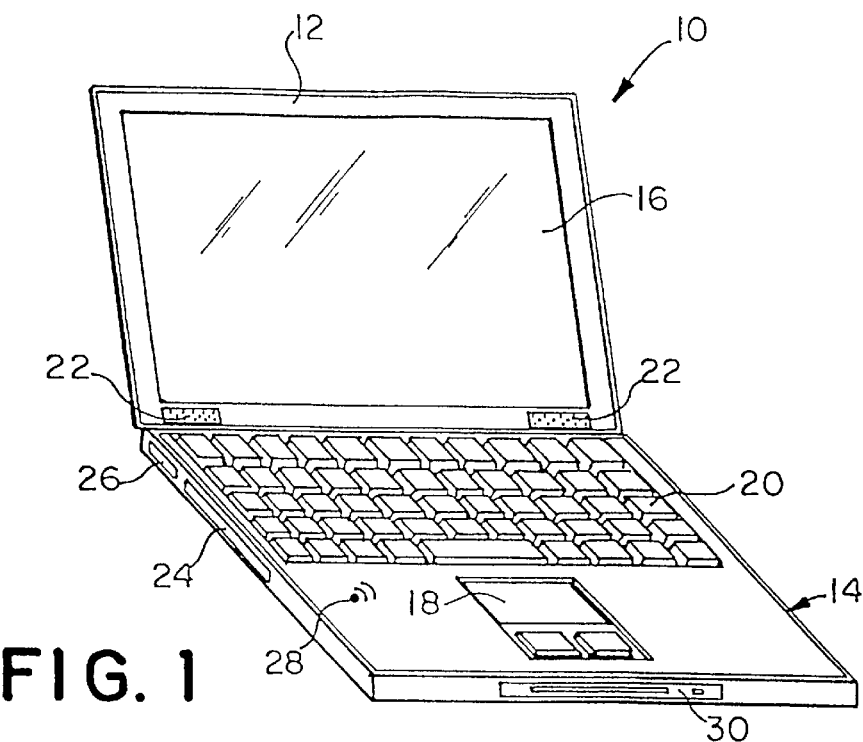
FIG. 1 is a perspective view of a stand-alone electronic apparatus for automatically minimizing the graphical user interface of a program during the program's processing time, in accordance with a first embodiment of the present invention.

Certain terminology is used herein for convenience only and is not to be taken as a limitation on the present invention. In the drawings, the same reference numerals are employed for designating the same elements throughout the several figures.

Definitions

The below described apparatus in accordance with the present invention is a stand-alone or interconnected device with electronic components for automatically switching the focus of the graphical user interface between two or more programs or information objects or information streams during the time of information processing or information downloading.

In this document, the term "stand-alone device" refers to devices including (but not limited to) computers, vending machines and kiosks. The term "stand-alone" device also refers to devices which automatically send orders or requests or data to third parties for processing, such as flower-ordering kiosks directly connected to a dispensing florist or the FTD wire-network, regardless of the manner of sending the orders, requests or data.

The term "interconnected device" refers to devices which perform the same functions as the aforementioned stand-alone device, but distribute the physical and electronic components among two or more locations and connect those components so that electronically encoded data can pass between and among them. Connection for example includes via wire, conduit or other substance through which electrical signals can pass, fiber-optic cables or other material through which light waves or other electromagnetic radiation can pass, via air or vacuum through which radio or other electromagnetic waves can pass. Connection includes any combination of the above, as well. Similarly, several otherwise stand-alone devices located in one building or group of buildings might share one or more printers, one or more modems for transmitting information, one or more central processing units, etc. The term includes systems in which the central processing unit is not located in one place but rather is distributed, where input is distributed, and where memory and data storage may be separate from the computational components (which themselves may be centrally located, located at various central places or distributed.) In other words, parts of the computations may be performed at different locations and parts of data may be stored at different locations. Computation and memory systems may include but need not include redundancies. The term interconnected device includes both hardwired components, and networked systems of components. The term includes but is not limited to systems of mainframes connected to dumb or smart terminals, personal computers or workstations, systems of client/servers connected to personal computers and workstations, and mixtures of such systems. The term interconnected device includes distributing the components over a network of networks such as the Internet. The term includes on-line computer access, interactive television access, and telephone access, where the input is through components (including but not limited to personal computers, interactive televisions, telephones, pagers, electronic organizers, electronic Rolodexes, personal digital assistants, ATM money machines, fax machines, scanners, and handwriting input devices) owned by various parties and possibly used for other purposes which may not be covered under this patent application. This term applies regardless of which part of the device is distributed. As such, the term interconnected device includes software and/or hardware which enables a personal computer, interactive television or telephone or other home or office machine or appliance to become part of an interconnected device for the purposes contained herein or enable such machines to simulate the workings of a stand-alone device or an interconnected device for the purposes contained herein. The term also includes software regardless of how distributed, and whether hardwired into the machine, hard coded into its operating system, written to hard disk or permanent memory, or into temporary storage (including but not limited to CD-ROM and floppy disk), or temporarily residing in the machine via Java-type applet downloaded from a server or off a network such as the Internet.

The term "interconnected device" includes software and/or hardware which enables a user, a sensing device, computer (or other) hardware, or software to delegate a command to or transmit an instruction to, or otherwise trigger an action by an interconnected device or an object which simulates the workings and/or actions of an interconnected device, even though owned by various parties and possibly used for other purposes which may not be covered under this patent application. An interconnected device includes a device which connects to more than one interconnected devices. The term interconnected device includes the situation when two or more interconnected devices link or communicate with one another, including ascertaining tasks, breaking them up into smaller parts, and distributing the partial tasks between or among the interconnected devices in forms of inter-device task delegation and also including situations in which the several interconnected devices must provide each other with information on a one time, repeated or on-going basis in order to accomplish the complete task or its partial components.

Overview of Present Invention

In the present invention, automatic switching occurs between a first mode wherein a first executable program is visible and active, and a second mode wherein a second executable program is visible and active. Switching is triggered by detecting that the first executable program has initiated an information processing mode. In one particular embodiment of the present invention, the first executable program is a browser for requesting, receiving and displaying information obtained from remote information sources, the first mode is a browser mode, and the information processing mode is the requesting by the browser for information.

A program or browser is "visible and active," when the program or browser is in focus. In the "visible and active" state, the program or browser may accept user inputs (e.g., keyboard commands). In a Windows environment, if plural windows are open (whether or not they are visible), the program or browser window which responds to user inputs is thus the "visible and active" window. Typically, this window is the topmost window when windows are tiled or stacked partially or entirely over each other. Thus, a program which is in an information processing mode for executing a requested function, and which does not accept a "full range" (discussed in more detail below) of user inputs during the information processing mode, is not "visible and active" during such a mode, even if the program is partially or fully viewable on the display screen. Likewise, a browser which is busy retrieving information, and which does not accept the full range of user inputs normally associated with its operation during retrieval, is not "visible and active" during retrieval, even if the browser is partially or fully viewable on the display screen.

The present invention provides a scheme for switching between two programs being executed at a user's computer interface, such as on a user's computer. In the scheme, a first executable program, such as an application program, is visible and active at a user's computer interface during a first mode. A scheme wherein the first executable program is a browser is described in more detail below. The first executable program includes an information processing mode. In the information processing mode, a full range of user interaction cannot occur with the first program. The first executable program is thus not visible and active in the information processing mode. Examples of information processing include performing a data processing task, performing an image processing task or retrieving or downloading data. A second executable program is visible and active at the user's computer interface during a second mode. Examples of second executable programs include a computer game, an audio or audiovisual display, and an application program. The second program operates outside of, and independent of, the first program. When the user's computer interface is in the first mode and it is detected that the first program has initiated the information processing mode, then the computer automatically switches the user's computer interface from the first mode to the second mode. That is, the second program automatically becomes visible and active.

When the programs are running in a Windows environment, each of the programs may have a separate window. Only one of the windows is visible and active at a time. In a Windows environment, there are many different ways to make one window visible and active, while another window is not visible and active, as discussed below.

Consider the example wherein (i) the user's computer interface is a computer, (ii) the user's computer is in the first mode, (iii) it is detected that the first program has initiated the information processing mode, (iv) and the user's computer automatically switches from the first mode to the second mode. Some examples of display screen changes which cause the first program to no longer be "visible and active" are as follows:

(1) The first program becomes concealed by automatically minimizing the first program's window. A button or icon indicating the presence of the first program remains on the screen's status bar or tool bar.

(2) The first program becomes concealed by automatically hiding the first program's window. When hidden, no button or icon indicating the presence of the first program necessarily remains on the screen's status bar or tool bar.

(3) The first program becomes concealed by automatically layering the first program's window behind the program window associated with the second program (e.g., in a lower layer or "Z" layer), or overlaying the second program's window over the first program's window.

(4) The window of the first program is reduced in size. If the windows of the first and second programs are simultaneously viewable, the size of the second program window may be increased so that the window of the second program becomes the prominent window on the display screen. Alternatively, the locations of the two windows may be repositioned so that the second window is placed in a more prominent position. If the window of the second program is not initially visible, then the window of the second program is displayed in such a manner that it becomes the prominent window on the display screen, compared to the reduced size first program window.

Similar types of program display screen manipulations may be performed for programs which do not execute in a Windows environment. The first program and the second program may have separate graphical user interfaces which are visible and active in their respective first and second modes. For example, the graphical user interface of the first program would not be visible and active in the second mode, such as when the first program is in the information processing mode and the second program is visible and active.

The user's computer switches from the second mode back to the first mode upon the occurrence of a predetermined event. In one preferred embodiment, the predetermined event is the completion of the information processing. Alternatively, the predetermined event may be the expiration of a preset time period, or the completion or manual exiting of the second program. Of course, if the first program is still performing information processing upon switching back to the first mode, then the first program would still not be visible and active, but may be viewable. Switching back from the second mode to the first mode may be automatic or manual. In a manual mode, the second program remains visible and active, but the user is informed that the information processing is completed and is prompted to enter a specific type of user input to return to the first mode.

Upon switching back to the first mode, the second program may be concealed by minimizing the second program, or by hiding or layering the second program (or its window) behind the first program (or its window).

In one scheme of the present invention, upon switching back to the first mode, the second program, or a part thereof, is stopped and the state of the stopped point in the second program is stored. The second program is then continued at the stopped point upon subsequent switching from the first mode to the second mode. For example, if the second program is a game, the game is stopped and resumed upon each mode switching. In one stop/resume scheme, the second program is terminated and is restarted and restored to the state at the stopped point. In another stop/resume scheme, the second program is not terminated but is frozen at the stopped point and is resumed without requiring any restoration. Furthermore, windows and programs may operate independently. Thus, a window may be closed or destroyed without terminating the program running in the window. The scope of the switching scheme includes different permutations wherein the window is closed and reopened, or wherein the window remains open, regardless of whether the second program is terminated and restored, or frozen and resumed.

As discussed above, the first executable program may be a browser. In this scheme, switching occurs between a browser mode and a program mode (or executable program mode) at a user's computer interface. In this scheme, a browser is provided at the user's computer interface for requesting, receiving and displaying information from remote information sources. In one preferred embodiment, the request for information is a request for a file (e.g., a web page or Java program) from a remote computer which is connected to the Internet. The browser is visible and active during the browser mode. An executable program is visible and active at the user's computer interface in the program mode. Examples of executable programs include a computer game, an application program, an audio or audiovisual presentation, and another browser or another instance or version of the browser associated with the first executable program. The executable program may also be a program that manipulates interstitial information which would automatically be presented upon a detection of a request for information by the browser. For example, the executable program may inhibit the display of information objects described in the Judson patent (discussed above) and may substitute different information for the information objects. The executable program operates outside of, and independent of, the browser. The executable program is visible and active during a program mode. When the user is in the browser mode and it is detected that the browser has requested information, the computer automatically switches from the browser mode to the program mode.

The browser implementation may further include the same concealment schemes, switching back schemes, and stop/resume schemes described with respect to the generic first executable program implementation wherein the browser and browser mode are equivalent to the first executable program and first mode, respectively, and the executable program and program mode are equivalent to the second program and second mode, respectfully. In the browser implementation, the predetermined event which causes switching back to the browser mode would typically be the receipt of the requested information at the user's computer interface or the expiration of a preset time period. However, the predetermined event may alternatively be the instance of locating the requested information, or locating the host computer that contains the requested information. Other events associated with Internet communication and browser operation may be used for the predetermined event.

In certain instances, it may be desirable to inhibit the automatic switching. For example, automatic switching may be inhibited upon a determination that no useful functions can be performed during the expected information processing time (in the first specific implementation) or during the expected information retrieval time (in the second implementation). In the second implementation, automatic switching may also be inhibited upon a determination that the requested information currently resides in the user's computer, and thus no communication with the remote information source is required to display the information at the user's computer.

The scope of the present invention also includes an embodiment that switches between two information objects wherein the information objects operate outside of, and independent of, each other but within the same executable program. The user may manually switch back and forth between the information objects, depending upon which information object the user desires to be visible and active. Furthermore, automatic switching from the first information object to the second information object may occur as a result of initiating an information processing mode for the first information object. Switching back from the first information object to the second information object is triggered by the occurrence of a predetermined event such as the completion of information processing of the first information object or due to the expiration of a predetermined time period. Switching back may be manual or automatic. The information object implementation may further include the same concealment schemes, switching back schemes, and stop/resume schemes described above with respect to the executable program implementation. Furthermore, the roles may be switched so that the first information object automatically becomes visible and active when information processing is initiated with respect to the second information object.

Consider, for example, a single spreadsheet application program or a single document processing program which allows two separate spreadsheets or two documents (i.e., information objects) to be simultaneously opened and manipulated, typically in different windows. In the spreadsheet example, a first spreadsheet may be initially visible and active. When information processing is initiated with respect to the first spreadsheet, the second spreadsheet may automatically become visible and active. Furthermore, the user may also manually switch back and forth between the spreadsheets even when the information processing mode has not been invoked.

In the information object embodiment, only one program may be visible and active. Accordingly, the two information objects, not two programs, operate outside of, and independent of, each other.

As discussed above, an executable program only accepts a full range of user inputs when it is visible and active, even if the program is partially or fully viewable on the display screen. When the executable program is not visible and active, user interaction is either nonexistent or very limited. User interaction would be nonexistent for programs which do not accept any user inputs during information processing. When user interaction is limited, selected functions, such as interrupting or stopping the information processing, or entering information for subsequent processing may be permitted. For example, while a browser is retrieving requested information and the second executable program is visible and active, the user may be able to stop the browser retrieval process but cannot otherwise interact with the browser. The scope of the present invention thus includes embodiments which allow for very limited interaction with the program that is not visible and active, as well as embodiments which do not allow for any interaction with the program that is not visible and active.

The scope of the present invention includes schemes which are implemented using personal computers that load and fully execute programs and browsers therein, as well as schemes that use a local computer merely to emulate a "dumb" terminal networked to a remote site computer, as well as devices which are or operate solely as dumb terminals, or other interconnected devices. In the dumb terminal scheme, all or most of the computing occurs at a remote site computer. The dumb terminal provides a display and one or more user input devices. In the dumb terminal device or other type of interconnected device (hereafter, "the device"), the device thus merely functions as an interface (e.g., a browser interface, an executable program interface). The actual mode switching occurs at the remote site computer. However, the result as experienced by the user should be indistinguishable from the scheme wherein the device is a personal computer that executes the programs and browsers. Accordingly, a browser or program which is "at the user's device" includes schemes wherein only the interfacing screens and user input devices are physically located at the user's device.

The present invention is preferably implemented in software as a computer program product including at least one computer readable medium having computer logic recorded thereon to perform the functions discussed above. If the user's device is a dumb terminal or a device with limited intelligence/processing capabilities, the software program or programs would be located at one or more remote computers. If the user's device is a personal computer, the software program or programs would be located either entirely in the user's device, or partially in the user's device and partially at one or more remote site computers.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the numeral 10 generally refers to a device for automatically minimizing windows in accordance with the invention. The device includes a base or body 14 and a video display 12 which includes a screen 16. The screen 16 may include a transparent interactive overlay to act as a touch screen, by which the user may use his or her finger or a stylus as a pointing device. A touch-pad pointer device 18 is also shown which may select items from the screen. An alphanumeric keyboard 20 is affixed to the base or body 14 of the apparatus for data entry of alphanumeric and other information. The video display 12 is hinged to the body 14. The video display 12 and body 14 swing together, so that the video display can act as a cover for the device 10. A slot 24 on the side of the apparatus allows the user to attach additional cards or cartridges (such as PCMCIA cards, which are not shown) to the apparatus which add functionalities, memory, programs, modems, etc. to the device 10. A communications port 26 (for example an infrared communications port) enables the apparatus 10 to exchange data wirelessly with other devices so equipped. A microphone 28 receives audio input. One or more speakers 22 provide audio output. A disk drive 30 allows data to be stored on disks or retrieved therefrom. The device may also contain additional internal storage such as a hard disk drive (not shown). Power is supplied by a rechargeable internal battery (not shown).

Figure 2:
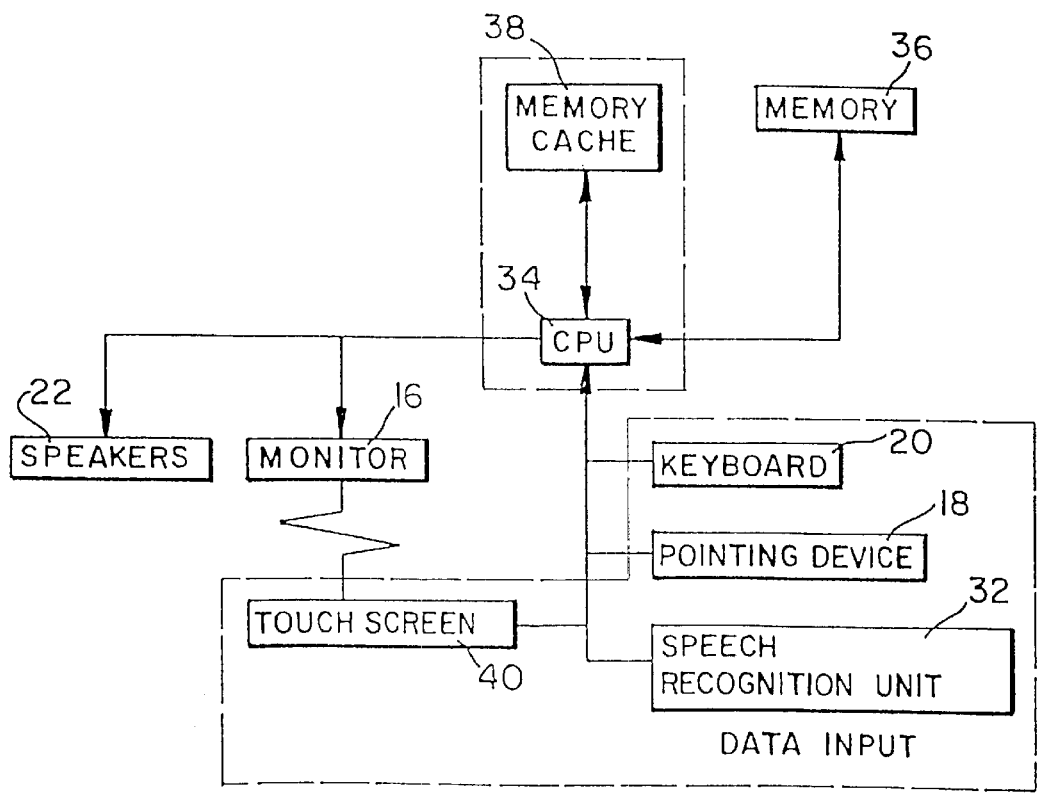
FIG. 2 is a schematic block diagram of the electronic apparatus of FIG. 1.

Referring to FIG. 2, a schematic block diagram of the apparatus 10 is illustrated. A programmable processor or CPU 34 is in communication with various kinds of memory 36 including in particular a fast memory cache 38. The CPU 34 is connected to various data input devices, such as the keyboard 20, a pointing device such as the touchpad 18, a mouse, track ball, touch-pad or other digitizer, a speech recognition unit 32, and a touch screen 40. In addition, the CPU is connected to output devices including a monitor such as an interactive screen 16 and speakers 22.

FIG. 3 illustrates a schematic block diagram of an alternative embodiment of the invention in which an interconnected device which includes the apparatus in FIG. 1 as one of the local devices (e.g., 62, 64, or 66) connected to a remote data source 48 for the system. The remote data source 48 may act as either a mainframe with "dumb" input devices, or as a server with "smart" input devices in a client/server architecture. The remote data source 48 may contain its own processor or CPU 52 and various kinds of memory 54. Although the diagram shows only one remote source, there may in fact be many, as in a computer network such as a local area network, wide area network, intranet, extranet or the Internet. In such a case, the entire network comprises many local devices (called "clients") and many remote data sources (called "servers") sometimes referred to as a "client/server" architecture.

Programs with graphical user interfaces (or data displayed in frames or windows) are run on local devices (62, 64 or 66). Each local device, whether a laptop computer or other hand-held electronic device 56, desktop or other personal computer 58, or interactive television 60, etc. includes or is attached to a modem 42 which digitizes and encodes the input requests for data (input components not shown in FIG. 3) for transmission to a remote data source 48. The request for data or other information object is transmitted to the remote data source 48 through a transmission system 46 which includes networks (such as the Internet), telephone systems (public and/or private), radio wave, microwave, and/or satellite transmission systems, infrared signals etc. At the remote data source 48, a modem 50 reconstitutes the request for data or other information object into an electronic form usable by the processor or CPU 52. The remote data source 48 may have one or more modems to perform the input and output operations. The remote data source 48 transmits information back to the local devices, first converting it for transmission via its modem 50, then transmitting the information over the transmission system 46 to the local devices (e.g., 62, 64, 66, etc.).

The modems 42 in the local devices (e.g., 62, 64, 66, etc.) each decode transmissions from the remote data source for local processing, storage and display. The local CPU's 34 process the information, displaying data and information objects via monitors 16 and speakers 22.

An Illustration of Automatic Switching Between Applications

The illustration is most easily understood in terms of a stand alone device such as a personal computer. But those knowledgeable in the art will also understand the illustration with respect to alternate embodiments such as an interactive or interconnected device to which a user has frequent access, like a desktop personal computer or dumb terminal connected to a network.

The illustration is most easily understood in terms of a device which can run two application programs (such as a word processor program and a spread sheet program) within a shell which automatically switches between the programs while one is waiting for information to be processed. The two application programs could be two independent instances of the same program (such as two spread sheet programs or two Internet browsers).

Although this preferred embodiment is described as a shell program which operates on top of the device's operating system, the shell could just as easily be incorporated into, embedded in, or integrated with the operating system. The invention might also be embodied not as a shell, but rather as a plug-in or other information object such as an Active X control which is called by the application programs. An alternate embodiment can handle more than two application programs. Alternatively, the invention may be embodied as (or within) a particular application program (such as a spread sheet program) which can open two or more information objects (e.g., documents or spread sheets) and which automatically switches between the documents while one is waiting for information to be processed. In some instances, the two information objects could be two instances of the same object (e.g., calculating projections using two instances of the same spread sheet but with two different interest rates).

FIG. 4 illustrates the general environment implemented by the invention within the preferred embodiment of a shell program 102 which switches between two application or other programs, labeled for convenience of the diagram only, "PROGRAM A" 104 and "PROGRAM B" 106.

When the user turns on the machine 100, the machine is booted up and launches a shell program (108). The shell program 102 may display visual information on a monitor 16, or play audio information through speakers 22, but need not. The shell program 102 (or parts of it) is memory resident and remains active even if not itself generating a display. The main purpose of the shell is to launch, monitor, control and close other programs (steps 110, 114 and 120), rather than present information itself. (However, the shell may be integrated into some other application which does present information.) Nonetheless, the shell may have certain parameters which a user can set (e.g., user preferences discussed elsewhere). These parameters and preferences may be set with the aid of various GUIs with not only screen displays 16 but audio instructions issued through speakers 22 as well. The user input in setting these parameters may occur through various input devices including touch screens 40, keyboards 20 of alphanumeric characters, pointing devices 18 such as touch pads, mice, joysticks, etc., speech recognition units 32 and/or other input devices.

Once the shell 102 is launched (step 108) and running, the user may launch or open a program such as PROGRAM A from within the shell (step 110). Later, the user may launch or open another program such as PROGRAM B from within the shell (step 114). While these programs are running (steps 112, 122, 116 and 124) the shell continues to operate (step 120), monitoring these programs, launching other programs and performing other functions such as switching between PROGRAM A and PROGRAM B. When all programs that were launched from the shell have been closed (steps 126 and 128), the shell itself may be closed (step 130) and the machine turned off (step 131).

Any particular program, such as PROGRAM A 104, once launched (step 110), will run (step 112), displaying information, processing user input, redisplaying information, etc. (step 122), until the user quits the program (step 128). If it is the sole program running, there might be no intervention from the shell program. Some other program, such as PROGRAM B 106, once launched (step 114), will run (step 116), displaying information, processing user input, redisplaying information, etc. (step 124), until the user quits the program (step 126). In some cases, PROGRAM B may operate alone and be the sole program running, in which case there might be no intervention from the shell program. In other instances, PROGRAM B can only be launched after PROGRAM A. This might occur if PROGRAM B is an add-on, plug-in, or plug-on program to PROGRAM A. For example, PROGRAM B may be a program for performing unique statistical calculations that works only with a specific spreadsheet program (PROGRAM A).

It is when more than one program, here PROGRAM A 104 and PROGRAM B 106, are both running that the shell program 102 is most active. Multi-tasking or multi-threading is the name given to the processing environment when two or more programs are processing information at the same time. Sometimes multi-tasking devices have more than one central processing unit in order to perform parallel processing. In other instances, a shell program (or the operating system) will allocate resources to the various running programs, and/or switch between the various running programs, so that the processing appears to be parallel. This is a particularly effective use of system resources when one task (program) takes few, but periodic, system resources, such as refreshing a screen display. Without multi-tasking, the central processing unit 34, would sit idle most of the time while a user viewed the screen display. Using multi-processing, the CPU can be performing other tasks such as making calculations for one program while the user is viewing the screen display generated for a second program.

In FIG. 4, multi-tasking 118 takes place when both PROGRAM A 122 and PROGRAM B 124 are running within the shell (step 120). During the multi-tasking, both PROGRAM A and PROGRAM B are displaying information, taking user input and processing data, etc., while the shell 102 allocates system resources to them and otherwise switches between them.

FIG. 5 illustrates the multi-tasking in greater detail. During the multi-tasking, three components are running concurrently, the shell 102, PROGRAM A 104 and PROGRAM B 106. At the start of this portion of the flow diagram (step 150), the shell is running (step 152), PROGRAM A is running (step 156) and PROGRAM B is running (step 158), all at the same time. The flow diagram shows three separate flow arrows to indicate that all three processes are happening in parallel (or approximately in parallel).

While the shell is running (step 152), it will perform a variety of functions (step 154) including minimizing other programs during processing times, the particular subject of this invention. Other functions include launching other programs and monitoring all programs. Some monitoring activities are necessary for this invention (e.g., to determine when to intervene to minimize programs) and others are not (e.g., some error trapping).

FIG. 5 illustrates when two programs are running over the shell. Consider first, when only one program is running over the shell. The flow diagram for a single active program is essentially the same as for PROGRAM B in FIG. 5. When such a program is running (step 158), it will display information (step 162) on the display screen 160. Concurrently, it will take user input (step 168), and display that input (step 162) on the display screen 160. If required, PROGRAM B will process information or user input. When it starts the processing (step 170), this event will trigger the monitoring function in the shell (step 154), which will minimize PROGRAM B on the screen display (step 172). PROGRAM B continues to process the information or input (step 176) while the program has been minimized on the display screen 160 (step 172). When the processing is complete (step 182), this event triggers the monitoring function in the shell (step 154), which then redisplays the PROGRAM B information (step 186) on the display screen 160. Notice that PROGRAM B is by itself multi-tasking or multi-threaded, performing processing while displaying information.

If a program (PROGRAM B) is the only one running in the shell, the flow diagram may vary from what is shown on FIG. 5. In an alternate embodiment (not shown), the shell will not minimize a program if it is the only one running in the shell. In such case, step 172 is omitted, and step 162 merges with step 186 for continuous screen display of the program. Steps 170 and 182 are still events that occur, but they do not trigger the shell (step 154) to take action such as minimizing the program (step 172) or maximizing the program (step 186).

This is very similar to a portion of PROGRAM A that occurs while a higher priority program such as PROGRAM B is also running but minimized (step 172). Consider steps 174, 178 and 180. When two programs are running, when the higher priority program (here PROGRAM B) is processing information, and thus is minimized (step 172), so that the other program (here PROGRAM A) displays information (step 174) on the screen 160, that other program (PROGRAM A) may act or appear as if it is the only program running in the shell.

If the user then decides to quit the priority program (step 188), PROGRAM B will close (step 194). Otherwise, the program (B) will continue running (step 158), displaying information (step 162) on the display screen 160 and taking user input (step 168).

Consider now when a first program, PROGRAM A, is running (steps 112 and 156) and a second program, PROGRAM B, is launched (step 114), and begins to run (steps 116 and 158). The launch event (step 114) will trigger the monitoring function in the shell (step 154), which will minimize the screen display of the first program, PROGRAM A (step 164), while the screen displays the information of the second program, PROGRAM B (step 162). During this time, PROGRAM A is still open and may continue to process information (step 166), but is not fully displayed on the screen.

While PROGRAM B is running (step 158), it will display information (step 162) on the display screen 160. Concurrently, it will take user input (step 168), and display that input (step 162) on the display screen 160. If required, PROGRAM B will process information or user input. When it starts the processing (step 170), this event will trigger the monitoring function in the shell (step 154), which will minimize the screen display of PROGRAM B (step 172), and display (or redisplay) information of PROGRAM A (step 174) on the screen display 160. PROGRAM B remains open and continues to process the information or input (step 176) while the program has been minimized (step 172) on the display screen 160, and while the information for PROGRAM A is being displayed (step 174). While the information for PROGRAM A is being displayed, it may also take user input (step 178), display that input (step 174), process that input or other information (step 180) and display or redisplay the processed information (step 174). Notice that PROGRAM A may be by itself multi-tasking or multi-threaded, performing processing while displaying information.

In an alternate embodiment (not shown), while the information or input processing in PROGRAM A occurs (step 180), the shell again minimized PROGRAM A, using triggers similar to those of PROGRAM B at steps 170 and 182. Even if no other "useful" program is running, the shell could display a screensaver, wallpaper or other effect embodied as a program or integrated into the underlying operating system, while PROGRAM A and PROGRAM B both continue open and processing but minimized on the screen 160.

Returning now to FIG. 5. When the processing of PROGRAM B is complete (step 182), this event triggers the monitoring function in the shell (step 154), which then redisplays the PROGRAM B information (step 186) on the display screen 160, while minimizing or continuing to minimize the display of PROGRAM A (step 184). Notice that in the multi-tasking or multi-threading environment 118 shown in FIG. 4 and shown in greater detail in FIG. 5, the individual programs PROGRAM A 104 and PROGRAM B 106 may each by itself be multi-tasking or multi-treaded.

If the user then decides to quit the PROGRAM B (step 188) (shown two places in FIG. 5 because this decision affects the flow diagrams of both PROGRAM A and PROGRAM B), PROGRAM B will close (step 194). Thereupon the information of PROGRAM A will be redisplayed (step 190), while PROGRAM A remains running (step 192). At this point the flow diagram of FIG. 5 would stop (step 194), although PROGRAM A would continue running as if it were the sole running program (see discussion above on running one program in the shell). Otherwise, if the user does not quit PROGRAM B, then PROGRAM B will continue running (step 158), displaying information (step 162) on the display screen 160 and taking user input (step 168), while PROGRAM A continues to run (step 156), processing information (step 166) with a minimized display (step 164).

In alternative embodiments, the user could quit PROGRAM A first, while PROGRAM B is still running, regardless of which program is displayed or minimized. In that case the shell would display (or redisplay) the PROGRAM B information and treat PROGRAM B as the sole program running as described above.

Alternatively, the user could elect to switch between the two programs and switch their "priority." In this case the flow diagram for PROGRAM A would mirror steps 158, 162, 168, 170, 172, 176, 182, 186 and 188, while the flow diagram for PROGRAM B would mirror steps 156, 164, 166, 174, 178, 180, 184, 188, 190 and 192.

Other programs could be launched from the shell (step 154) while both PROGRAM A and PROGRAM B are running. If the flow diagram for the top priority program would look like the flow diagram for PROGRAM B, the flow diagram for the bottom priority program would look like the flow diagram for PROGRAM A. The flow diagram for an intermediate priority program would look similar to the flow diagram for PROGRAM A, but with step 180 expanded to include event triggers for starting the information processing (similar to step 170) and finishing the information processing (similar to step 182). These events would trigger the shell (step 154) to minimize the display of the active program and display the information for the program of next lower priority.

Not all information processing necessarily triggers program minimization. Short processes (especially those taking less than a second, or less than a few seconds) might not trigger minimization if useful work could not be done in the expected processing time. This may depend on the program doing the processing or on the program with lower priority that will be displayed if the first program will be minimized. Other contingent factors may affect the minimization process, such as user chosen options or preferences.

Implementation Details for Switching Between an Internet Browser and a Second Program, Such as a Game The following is a detailed description of a preferred implementation of the present invention, but is not meant to limit the application of the invention. This implementation automatically switches between a computer's Internet browser and another program such as a computer game (e.g., card games such as solitaire, hearts or free cell) previously installed on the computer's hard disk. For purposes of this illustration the browser is assumed to have greater priority than the game (although the software could be designed otherwise). More specifically, the user is assumed to browse the Internet using the browser software. When the browser is searching for and downloading a new page from the World Wide Web of the Internet, the software minimizes the browser and shows the game. Once the new page has been downloaded, the game is minimized and game play paused while the browser shows new Web page.

The implementation described is for a personal computer using a Microsoft™ Windows 95 operating system using Microsoft's Internet Explorer 4.0 browser ("IE4"), with a computer game such as Microsoft™ Solitaire or Microsoft™ Free Cell (another form of solitaire) installed on the computer's hard drive. (Microsoft™ Internet Explorer, Microsoft™ Solitaire and Microsoft™ Free Cell have been frequently bundled with Microsoft™ Windows 95 and all have been frequently pre-installed on computers by original equipment manufacturers such as Gateway.) The described implementation is written in C++ and consists of three separate software modules: a Browser Helper Object, an Auto-Minimizer Controller, and an Application Wrapper.

The implementation may also be written in other languages. More or less than three modules could be used. However the invention is most easily understood in terms of three functionalities which may be coded separately.

The Browser Helper Object "listens" to messages sent by the Internet browser. The Browser Helper Object is particularly listening for the following messages: the "Before Navigate" event or message, which indicates that the user has directed the browser to retrieve a file and the browser is about to do so; the "Page Contacted" event or message, which indicates that the requested page, web-site or file has been "found" and contact made with its host; the "Page Downloaded" event or message, which indicates that the browser has downloaded to the user's machine all the files, images, etc. contained in the requested page; the "On Quit" event or message, which indicates that the user has closed, quit or otherwise exited the browser program; and messages concerning the status text.

When the Browser Helper Object receives one of these messages, it rebroadcasts them to the Auto-Minimizer Controller. The Auto-Minimizer Controller, created by the Browser Helper Object, "listens" for messages from the Browser Helper Object. When the Auto-Minimizer Controller receives a message that the Before Navigate event has occurred, it starts one of the applications using an Application Wrapper. Depending on the user's preference, the Page Contacted or the Page Downloaded message minimizes, "turns off" or hides the other application. The On Quit message will close, exit or quit the other application as well as the Application Wrapper, the Auto-Minimizer Controller and the Browser Helper Object.

An alternative embodiment of the invention works with Netscape's Navigator 4.0 browser (or other browsers) rather than Microsoft's Internet Explorer 4.0 browser. However, the Browser Helper Object is browser specific. In other words, the Browser Helper Object for Microsoft's Internet Explorer 4.0 browser is different from the Browser Helper Object for Netscape's Navigator 4.0 browser, and even different from the Browser Helper Object for earlier versions of Microsoft's Internet Explorer. This is because different browsers and browser versions send different "messages" on the occasion of specific events (e.g., the Page Contacted event), and require different types of objects to "listen" to those messages. Moreover, if a browser does not generate a message when a particular event occurs (e.g., Netscape Navigator and Internet Explorer 3.x do not generate individual "Frame Downloaded" messages), the Browser Helper Object may "observe" the event by "monitoring" other browser messages, or other operating system activities. Sometimes messages are sent on events, but not documented, in which case creating the Browser Helper Object requires event monitoring and special case testing to identify appropriate messages.

The Browser Helper Object for IE4 uses the Object Linking and Embedding ("OLE") protocol to "talk" to IE4 and is implemented as a Dynamic Link Library ("DLL") executable program that is called by each instance of IE4 at startup. IE4automatically loads properly registered DLL's that implement the IOleObjectWithSite interface as defined in the Microsoft ATL header files. As known to those knowledgeable in the art, overriding the proper function in the object can retrieve the IWebBrowserApp interface. The IWebBrowserApp interface is used to control IE4. The Browser Helper Object contains code that creates an "event sink" for "listening" to IE4 messages. The event sink is registered with IE4 at run time when the Browser Helper Object implements and exposes the DWebBrowserEvents2 interface. This interface is passed to IE4 which fires the appropriate event functions.

There is currently no standard method for setting up an event sink in one program to work with another program, but one knowledgeable in the art can emulate the Microsoft implementation to create an event sink that will work for Microsoft's IE4.

The IE4 OLE interface functions that the Browser Helper Object interprets and uses are BeforeNavigate2, NavigateComplete2, DocumentComplete, StatusTextChange, and OnQuit.

In general, the BeforeNavigate2 is used to instruct the Auto-Minimizer Controller to activate the game or application when the browser sends a message on the Before Navigate event. The NavigateComplete2 or the DocumentComplete (depending on user preference) is used to instruct the Auto-Minimizer Controller to deactivate the game or application when the browser sends a message on the Page Contacted or Page Downloaded event. The OnQuit is used to shut down the Browser Helper Object, the Application Wrapper, the application and the Auto-Minimizer Controller when the browser is shut down. The StatusTextChange is used to pass the Status Text to the Auto-Minimizer Controller.

The Browser Helper Object parses destination URL's to ensure that the game or other application will appear only if the browser is navigating to a new page on the web. The application or game will not show if navigation is to a cached web page in the history file, to another file on the hard drive, or an anchor in the currently loaded page. The Browser Helper Object also checks to see if the minimum run time of the game or application has elapsed or if the user has put the game on pause or hold.

In an alternative embodiment of the invention, the user browses the Internet with Netscape's browser rather than Microsoft's. The Browser Helper Object for Netscape™ Navigator 4.0 has similar functionality to the Browser Helper Object for IE4 but is created as a stand alone executable using Microsoft's Dynamic Data Exchange ("DDE") protocol to speak and listen to Navigator 4.0. As mentioned above, Navigator 4.0 does not send a message when a page has finished downloading. This Page Downloaded event can be approximated by the Browser Helper Object which "listens" as each individual object on the page is downloaded. When Navigator 4.0 stops downloading new objects, the Browser Helper Object assumes that the Page Downloaded event has occurred.

The Browser Helper Object for other browsers must be customized to produce similar functionalities but using the interfaces exposed by the particular browser, the events recognized by it, and the messages sent by it.

The Auto-Minimizer Controller receives messages from the Browser Helper Object, processes the messages and controls the window(s) for the game(s) and/or applications(s) that are displayed on the user's computer monitor when the browser is downloading a new page, primarily by making said window(s) visible and invisible (e.g., minimizing them). (It can also control them by changing the windows position and/or size.) The Auto-Minimizer Controller accepts user input to change Auto-Minimizer preferences and settings. The Controller acts as an event-driven executable with only one instance in memory at any one time. The Controller is an OLE server that implements the applications through one or more custom interfaces and listens to events via an application sink interface.

The Auto-Minimizer Controller interface remains the same no matter what Browser Helper Object is implemented, and no matter which Application Wrapper is instantiated.

The Application Wrapper is an application written to allow for an outside process to maintain and control certain aspects of a second process GUI (graphical user interface) as well as certain other aspects of the application such as the timer. The extent of control in this implementation is based on the amount of control one can obtain from using the Windows system messages to send commands to the application. The Application Wrapper makes extensive use of posting messages to a programs event loop so that it may control a Windows game.

Upon initialization, the Application Wrapper creates a dialogue box that enumerates the applications which have been "wrapped" and which are available on the user's computer. (The Windows API call SearchPath is used to determine whether the implemented application is installed on the user's machine.) The user then specifies the application he or she wishes to be displayed during page downloads. The below described preferred implementation is written in C++ using a class system with a base class and multiple derived classes for the specific applications. An alternative embodiment could be written in other languages.

In the preferred implementation, the base class is designed for games such as Microsoft™ Solitaire that run in windows mode on computers with a Windows 95 operating system. Alternative implementations of this invention would be coded to run other applications or run applications on computers with other operating systems such as the Windows 98 operating system from Microsoft or the MacIntosh operating system from Apple computers. The preferred implementation has a derived class for each supported game (i.e. separate derived classes for Solitaire, Free Cell, Hearts and other supported games). The structure allows for the addition of other games very easily by deriving a class from the base class and overloading the member functions: launchGame, gameControlLoop, pauseGame, resumeGame, and shutDown to do the required tasks for each of the self documented member function names.

Upon selection of a specific game, the class is instantiated and then a call to launchGame is made. This member function causes an instance of the application to be created, with its own window, and gets handles on the opened window so that messages can be sent to it. Immediately upon launch, a call to pauseGame is made to hide the window. When the browser begins to navigate to a new page (i.e. the Before Navigate event fires and the Before Navigate message is passed from the browser through the Browser Helper Object and the Auto-Minimizer Controller to the Application Wrapper), the Application Wrapper makes a call to resumeGame which displays the game's window. When the appropriate message (either Page Contacted or Page Downloaded depending on user preference) is passed from the browser through the Browser Helper Object and the Auto-Minimizer controller to the Application Wrapper, the pauseGame function is called to again hide the game's window.

The gameControlLoop function determines the state position and size of the game being played and makes appropriate adjustments in the application. The shutDown function sends the appropriate window(s) the messages necessary to gracefully shut down and clean up garbage.

To create the Application Wrapper for a particular game (or other type of application) it is necessary to understand the messages that the game sends and which messages the game will act upon. Frequently these are not documented, but one knowledgeable in the art can decipher them using Microsoft's Spy++ tool in Microsoft's Developer Studio (or an analogous tool by another software manufacturer) which allows a software developer to monitor messages sent, received, or processed by an application. With sufficient testing, a software developer can determine which messages are used by the application to do simple tasks such as stopping the timer (i.e. for the pauseGame function) or resuming the game (for the resumeGame function).

In an alternative embodiment of the invention, the game, application or other stand alone program includes code to accept the messages sent by and through the AutoMinimizer Controller. In this embodiment the Application Wrapper is not necessary and can be omitted because the Auto-Minimizer Controller controls the application directly.

In an alternative embodiment of the invention, the Auto-Minimizer Controller opens more than one application or window while the browser is downloading a page. For example, one window runs the game, while another window (which takes part of the screen) displays instructions for game play. As another example, one window runs the game, while another window (showing simultaneously on a part of the screen) is another instance of the browser (or an instance of a different browser) and displays an advertisement previously downloaded from the Internet. The Application Wrapper may control one or more of these applications or the Auto-Minimizer Controller may control one or more of these applications directly. Alternatively, the Application Wrapper may control some while the Auto-Minimizer Controller controls others directly.

In an alternative embodiment of the invention, the Auto-Minimizer Controller displays the browser on only a portion (say ¾) of the screen, even though it is the primary application. On part of the remainder of the screen, the Auto-Minimizer Controller displays a small window showing a "reduced" version of the game. (Other windows may be displayed in the remaining screen as well.) When the browser is downloading a page, the Auto-Minimizer Controller "expands" the display of the game window to fill the entire screen (or at least a larger portion of it) and minimizes the browser window.

From the foregoing description, it can be seen that the present invention comprises an apparatus and methods for automatically minimizing a computer program's window while the program is processing information, and during that time to display another program's window. Although the specific examples shown in the figures and described in the Internet browser implementation function by minimizing windows, the scope of the invention includes other forms of window concealment schemes such as hiding, layering, or overlaying, as well as schemes for reducing the prominence of the window, such as window size reduction, window relocation.

It will be recognized by those skilled in the art that changes may be made to the above-described embodiment of the invention without departing from the broad inventive concepts thereof. It is understood, therefore, that this invention is not limited to the particular embodiment disclosed, but is intended to cover all modifications which are within the spirit and scope of the invention as defined by the appended claims.

What is claimed is:

1. A method of switching between two executable programs, the method comprising:
    (a) providing a first executable program which is visible and active at a user's computer interface during a first mode, the first program including an information processing mode, wherein a full range of user interaction cannot occur with the first program during the information processing mode;
    (b) providing a second executable program which is visible and active at a user's computer interface during a second mode, wherein the second program operates outside of, and independent of, the first program;
    (c) during the first mode, detecting initiation by the first executable program of the information processing mode; and
    (d) automatically switching from the first mode to the second mode upon detecting initiation of the information processing mode.

2. A method according to claim 1 further comprising:
    (e) switching from the second mode to the first mode upon the occurrence of a predetermined event.

3. A method according to claim 2 wherein the predetermined event is the completion of the information processing.

4. A method according to claim 3 wherein step (e) includes automatically switching upon completion of the information processing.

5. A method according to claim 2 wherein the predetermined event is the expiration of a preset time period.

6. A method according to claim 2 further comprising:
    (f) stopping at least part of the second program upon switching from the second mode to the first mode;
    (g) storing the state of the second program at the stopped point; and
    (h) continuing the second program at the stopped point upon subsequent switching from the first mode to the second mode.

7. A method according to claim 2 wherein step (e) further comprises minimizing the second program during the first mode.

8. A method according to claim 2 wherein step (e) further comprises concealing the second program during the first mode by hiding or layering the second program behind the first program.

9. A method according to claim 1 wherein the first executable program is a browser for requesting, receiving and displaying information obtained from remote information sources, the first mode is a browser mode, and the information processing mode is the requesting by the browser for information.

10. A method according to claim 9 further comprising:
    (e) switching from the second mode to the first mode upon the occurrence of a predetermined event, wherein the predetermined event is the receipt of the requested information at the user's computer interface.

11. A method according to claim 9 wherein the requesting by the browser for information is a request for a file from a remote computer which is connected to the Internet.

12. A method according to claim 9 wherein the user's computer interface is a computer, the method further comprising:
    (e) inhibiting the automatic switching of step (d) upon a determination that the requested information currently resides in the user's computer, and thus no communication with a remote information source is required to display the information at the user's computer.

13. A method according to claim 9 wherein step (d) further comprises minimizing the browser during the second mode.

14. A method according to claim 9 wherein the second executable program is another browser.

15. A method according to claim 9 wherein the second executable program is a program that manipulates interstitial information which would automatically be presented upon a detection of a request for information.

16. A method according to claim 1 wherein the information processing mode of the first program is a data processing task.

17. A method according to claim 1 wherein the information processing mode of the first program is an image processing task.

18. A method according to claim 1 wherein the information processing mode of the first program is a data retrieval or downloading task.

19. A method according to claim 1 wherein step (d) further comprises minimizing the first program during the second mode.

20. A method according to claim 1 wherein step (d) further comprises concealing the first program during the second mode by hiding or layering the first program behind a program window associated with the second program.

21. A method according to claim 1 wherein the first program is within a first window and the second program is within a second window, and step (d) further comprises reducing the size of the first window.

22. A method according to claim 1 wherein the first program is within a first window and the second program is within a second window, and step (d) further comprises increasing the size of the second window.

23. A method according to claim 1 wherein the first program is within a first window and the second program is within a second window, and step (d) further comprises repositioning the locations of the first window and the second window.

24. A method according to claim 1 wherein the second program is a computer game.

25. A method according to claim 1 wherein the second program causes displaying of an audio or an audiovisual presentation.

26. A method according to claim 1 wherein the first program is an application program.

27. A method according to claim 1 wherein the first and the second programs are application programs.

28. A method according to claim 1 wherein the first program and the second program have separate windows.

29. A method according to claim 1 wherein the first program has a graphical user interface which is visible and active only during the first mode.

30. A method according to claim 1 wherein the first program and the second program have separate graphical user interfaces which are visible and active in the respective first and second modes.

31. A method according to claim 1 further comprising:
(e) inhibiting the automatic switching of step (d) upon a determination that no useful functions can be performed during the expected information processing time.

32. An apparatus for switching between two executable programs, the apparatus comprising:
(a) a first executable program which is visible and active at a user's computer interface during a first mode, the first program including an information processing mode, wherein a full range of user interaction cannot occur with the first program during the information processing mode;
(b) a second executable program which is visible and active at a user's computer interface during a second mode, wherein the second program operates outside of, and independent of, the first program;
(c) means for detecting initiation by the first program of the information processing mode during the first mode; and
(d) means for automatically switching from the first mode to the second mode upon detecting initiation of the information processing mode.

33. An apparatus according to claim 32 further comprising:
(e) means for switching from the second mode to the first mode upon the occurrence of a predetermined event.

34. An apparatus according to claim 33 wherein the predetermined event is the completion of the information processing.

35. An apparatus according to claim 34 wherein the means for switching from the second mode to the first mode causes the switching to occur automatically upon completion of the information processing.

36. An apparatus according to claim 33 wherein the predetermined event is the expiration of a preset time period.

37. An apparatus according to claim 33 further comprising:
(f) means for stopping at least part of the second program upon switching from the second mode to the first mode;
(g) a memory for storing the state of the second program at the stopped point; and
(h) means for continuing the second program at the stopped point upon subsequent switching from the first mode to the second mode.

38. An apparatus according to claim 33 fturther comprising:
(f) means for minimizing the second program upon switching from the second mode to the first mode.

39. An apparatus according to claim 33 further comprising:
(f) means for concealing the second program during the first mode by hiding or layering the second program behind the first program.

40. An apparatus according to claim 32 wherein the first executable program is a browser for requesting, receiving and displaying information obtained from remote information sources, the first mode is a browser mode, and the information processing mode is the requesting by the browser for information.

41. An apparatus according to claim 40 further comprising:
(e) means for switching from the second mode to the first mode upon the occurrence of a predetermined event, wherein the predetermined event is the receipt of the requested information at the user's computer interface.

42. An apparatus according to claim 40 wherein the requesting by the browser for information is a request for a file from a remote computer which is connected to the Internet.

43. An apparatus according to claim 40 wherein the user's computer interface is a computer, the apparatus further comprising:
(e) means for inhibiting the automatic switching upon a determination that the requested information currently resides in the user's computer, and thus no communication with a remote information source is required to display the information at the user's computer.

44. An apparatus according to claim 40 further comprising:
(e) means for minimizing the browser during the second mode.

45. An apparatus according to claim 40 wherein the second executable program is another browser.

46. An apparatus according to claim 40 wherein the second executable program is a program that manipulates interstitial information which would automatically be presented upon a detection of a request for information.

47. An apparatus according to claim 32 wherein the information processing mode of the first program is a data processing task.

48. An apparatus according to claim 32 wherein the information processing mode of the first program is an image processing task.

49. An apparatus according to claim 32 wherein the information processing mode of the first program is a data retrieval or downloading task.

50. An apparatus according to claim 32 further comprising:
(e) means for minimizing the first program during the second mode.

51. An apparatus according to claim 32 further comprising:
(e) means for concealing the first program during the second mode by hiding or layering the first program behind a program window associated with the second program.

52. An apparatus according to claim 32 wherein the first program is within a first window and the second program is within a second window, the apparatus further comprising:
(e) means for reducing the size of the first window upon automatic switching from the first mode to the second mode.

53. An apparatus according to claim 32 wherein the first program is within a first window and the second program is within a second window, the apparatus further comprising:
(e) means for increasing the size of the second window upon automatic switching from the first mode to the second mode.

54. An apparatus according to claim 32 wherein the first program is within a first window and the second program is within a second window, the apparatus further comprising:
(e) means for repositioning the locations of the first window and the second window upon automatic switching from the first mode to the second mode.

55. An apparatus according to claim 32 wherein the second program is a computer game.

56. An apparatus according to claim 32 wherein the second program causes displaying of an audio or an audio-visual presentation.

57. An apparatus according to claim 32 wherein the first program is an application program.

58. An apparatus according to claim 32 wherein the first and the second programs are application programs.

59. An apparatus according to claim 32 wherein the first program and the second program have separate windows.

60. An apparatus according to claim 32 wherein the first program has a graphical user interface which is visible and active only during the first mode.

61. An apparatus according to claim 32 wherein the first program and the second program have separate graphical user interfaces which are visible and active in the respective first and second modes.

62. An apparatus according to claim 32 further comprising:
(e) means for inhibiting the automatic switching upon a determination that no useful functions can be performed during the expected information processing time.

63. A computer program product including at least one computer readable medium having computer program logic recorded thereon for switching between two executable programs, the at least one computer readable medium comprising:

(a) a first executable program which is visible and active during a first mode, the first executable program including an information processing mode, wherein a full range of user interaction cannot occur with the first executable program during the information processing mode;
(b) a second executable program which is visible and active during a second mode, wherein the second executable program operates outside of, and independent of, the first executable program;
(c) means for detecting initiation by the first program of the information processing mode during the first mode; and
(d) means for automatically switching from the first mode to the second mode upon detecting initiation of the information processing mode.

64. The computer program product of claim 63 wherein the at least one computer readable medium further comprises:
(e) means for switching from the second mode to the first mode upon the occurrence of a predetermined event.

65. The computer program product of claim 64 wherein the predetermined event is the completion of the information processing.

66. The computer program product of claim 65 wherein the at least one computer readable medium means for switching from the first mode to the second mode causes the switching to occur automatically upon completion of the information processing.

67. The computer program product of claim 64 wherein the predetermined event is the expiration of a preset time period.

68. The computer program product of claim 64 wherein the at least one computer readable medium further comprises:
(f) means for stopping at least part of the second program upon switching from the second mode to the first mode;
(g) means for storing the state of the second program at the stopped point; and
(h) means for continuing the second program at the stopped point upon subsequent switching from the first mode to the second mode.

69. The computer program product of claim 64 wherein the at least one computer readable medium further comprises:
(f) means for minimizing the second program upon switching from the second mode to the first mode.

70. The computer program product of claim 64 wherein the at least one computer readable medium further comprises:
(f) means for concealing the second program during the first mode by hiding or layering the second program behind the first program.

71. The computer program product of claim 63 wherein the first executable program is a browser for requesting, receiving and displaying information obtained from remote information sources, the first mode is a browser mode, and the information processing mode is the requesting by the browser for information.

72. The computer program product of claim 71 wherein the at least one computer readable medium further comprises:
(f) means for switching from the second mode to the first mode upon the occurrence of a predetermined event, wherein the predetermined event is the receipt of the requested information at a user's computer interface.

73. The computer program product of claim 71 wherein the requesting by the browser for information is a request for a file from a remote computer which is connected to the Internet.

74. The computer program product of claim 71 wherein the at least one computer readable medium further comprises:
(e) means for inhibiting the automatic switching upon a determination that the requested information currently resides in a user's computer, and thus no communication with a remote information source is required to display the information at the user's computer.

75. The computer program product of claim 71 wherein the at least one computer readable medium further comprises:
(e) means for minimizing the browser during the second mode.

76. The computer program product of claim 71 wherein the second executable program is another browser.

77. The computer program product of claim 71 wherein the second executable program is a program that manipulates interstitial information which would automatically be presented upon a detection of a request for information.

78. The computer program product of claim 63 wherein the information processing mode of the first program is a data processing task.

79. The computer program product of claim 63 wherein the information processing mode of the first program is an image processing task.

80. The computer program product of claim 63 wherein the information processing mode of the first program is a data retrieval or downloading task.

81. The computer program product of claim 63 further comprising:
(e) computer readable medium means for minimizing the first program during the second mode.

82. The computer program product of claim 63 wherein the at least one computer readable medium further comprises:
(e) means for concealing the first program during the second mode by hiding or layering the first program behind a program window associated with the second program.

83. The computer program product of claim 63 wherein the first program is within a first window and the second program is within a second window, the at least one computer readable medium further comprising:
(e) means for reducing the size of the first window upon automatic switching from the first mode to the second mode.

84. The computer program product of claim 63 wherein the first program is within a first window and the second program is within a second window, the at least one computer readable medium further comprising:
(e) means for increasing the size of the second window upon automatic switching from the first mode to the second mode.

85. The computer program product of claim 63 wherein the first program is within a first window and the second program is within a second window, the at least one computer readable medium further comprising:
(e) means for repositioning the locations of the first window and the second window upon automatic switching from the first mode to the second mode.

86. The computer program product of claim 63 wherein the second program is a computer game.

87. The computer program product of claim 63 wherein the second program causes displaying of an audio or an audiovisual presentation.

88. The computer program product of claim 63 wherein the first program is an application program.

89. The computer program product of claim 63 wherein the first and the second programs are application programs.

90. The computer program product of claim 63 wherein the first program and the second program have separate windows.

91. The computer program product of claim 63 wherein the first program has a graphical user interface which is visible and active only during the first mode.

92. The computer program product of claim 63 wherein the first program and the second program have separate graphical user interfaces which are visible and active in the respective first and second modes.

93. The computer program product of claim 63 wherein the at least one computer readable medium further comprises:
(e) means for inhibiting the automatic switching upon a determination that no useful functions can be performed during the expected information processing time.

94. A method of switching between two information objects, the method comprising:
(a) providing a first information object which is visible and active at a user's computer interface during a first mode, the first information object including an information processing mode, wherein a full range of user interaction cannot occur with the first information object during the information processing mode;
(b) providing a second information object which is visible and active at a user's computer interface during a second mode, wherein the second information object operates outside of, and independent of, the first information object;
(c) providing means for allowing the user to manually switch back and forth between the first information object and the second information object, depending upon which information object the user desires to be visible and active;
(d) during the first mode, detecting initiation by the first information object of the information processing mode; and
(e) automatically switching from the first mode to the second mode upon detecting initiation of the information processing mode.

95. A method according to claim 94 further comprising:
(f) switching from the second mode to the first mode upon completion of the information processing and storing the state of the second information object upon switching from the second mode to the first mode so that the state of the second information object may be restored upon a subsequent switching from the first mode to the second mode.

96. An apparatus for switching between two information objects, the apparatus comprising:
(a) a first information object which is visible and active at a user's computer interface during a first mode, the first information object including an information processing mode, wherein a full range of user interaction cannot occur with the first information object during the information processing mode;
(b) a second information object which is visible and active at a user's computer interface during a second mode, wherein the second information object operates outside of, and independent of, the first information object;

(c) means for allowing the user to manually switch back and forth between the first information object and the second information object;

(d) means for detecting initiation by the first information object of the information processing mode during the first mode; and (e) means for automatically switching from the first mode to the second mode upon detecting initiation of the information processing mode.

97. An apparatus according to claim 96 further comprising:

(f) means for switching from the second mode to the first mode upon completion of the information processing; and (g) means for storing the state of the second information object upon switching from the second mode to the first mode so that the state of the second information object may be restored upon a subsequent switching from the first mode to the second mode.

98. A computer program product including at least one computer readable medium having computer program logic recorded thereon for switching between two information objects, the at least one computer readable medium comprising:

(a) a first information object which is visible and active during a first mode, the first information object including an information processing mode, wherein a full range of user interaction cannot occur with the first information object during the information processing mode;

(b) a second information object which is visible and active during a second mode, wherein the second information object operates outside of, and independent of, the first information object;

(c) means for allowing the user to manually switch back and forth between the first information object and the second information object;

(d) means for detecting initiation by the first information object of the information processing mode during the first mode; and (e) means for automatically switching from the first mode to the second mode upon detecting initiation of the information processing mode.

99. The computer program product of claim 98 wherein the at least one computer readable medium further comprises:

(f) means for switching from the second mode to the first mode upon completion of the information processing; and (g) means for storing the state of the second information object upon switching from the second mode to the first mode so that the state of the second information object may be restored upon a subsequent switching from the first mode to the second mode.

* * * * *